June 14, 1960   R. L. P. TRANNOY   2,940,700
EMERGENCY BUOYANCY DEVICES FOR HELICOPTERS
Filed July 5, 1957   3 Sheets-Sheet 2

June 14, 1960 R. L. P. TRANNOY 2,940,700
EMERGENCY BUOYANCY DEVICES FOR HELICOPTERS
Filed July 5, 1957 3 Sheets-Sheet 3
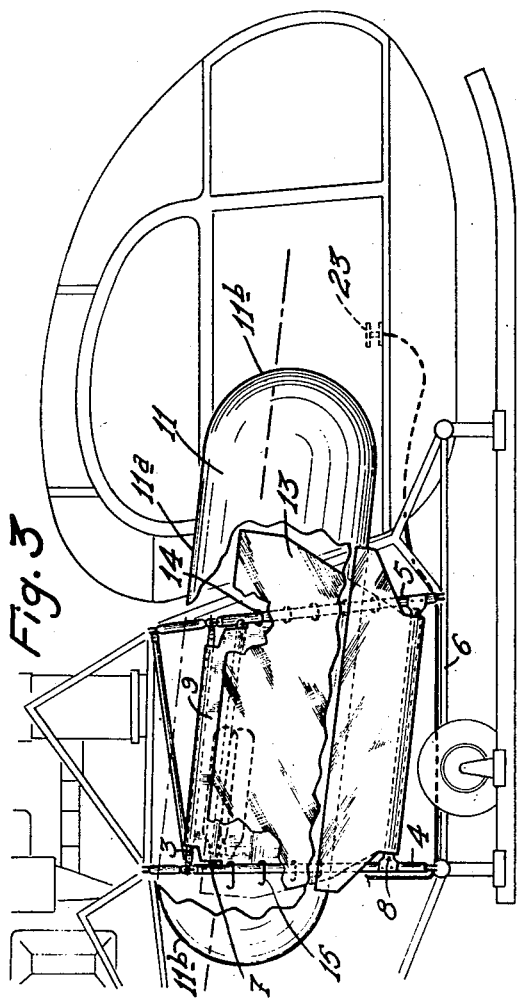
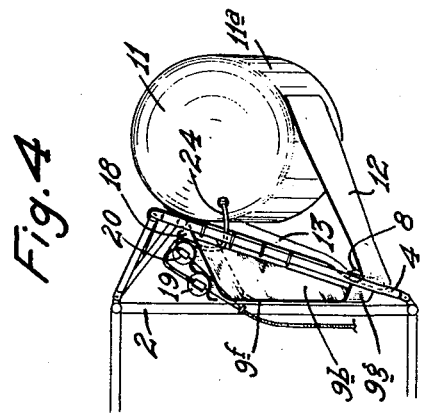
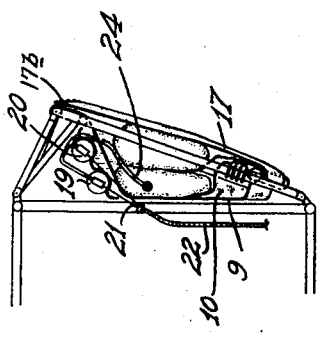
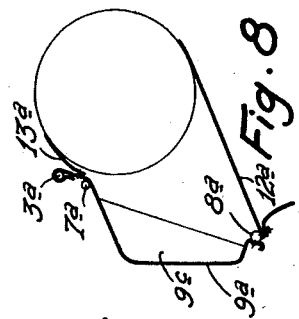
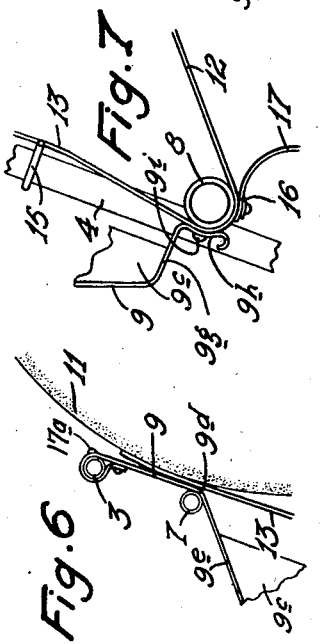

United States Patent Office 2,940,700
Patented June 14, 1960

2,940,700

EMERGENCY BUOYANCY DEVICES FOR HELICOPTERS

Roger Léon Paul Trannoy, Bondy, France, assignor to Sud Aviation Societe Nationale de Constructions Aeronautiques, Paris, France Filed July 5, 1957, Ser. No. 670,023

Claims priority, application France July 18, 1956

5 Claims. (Cl. 244—107)

Emergency devices are already known which enable helicopters to float after having alighted on water, these devices comprising as a rule ballonets or collapsible floats normally folded up and housed in adequate compartments which in case of emergency alighting on water open as the ballonets or like floats are inflated with a compressed gas, for example compressed air or $CO_2$, contained in a bottle or like vessel. The known arrangements proposed for helicopters comprise as a rule two ballonets of ellipsoidal configuration which are carried by the front portion of the aircraft and inflated outside the helicopter when the forced alighting takes place, a permanently inflated ballonet being furthermore contained in the faired tail structure supporting the antitorque rotor.

Now it is the object of this invention to provide an improved device of the general type set forth hereinabove, which is characterized by constructive and functional advantages of which the main ones are listed hereafter:

The buoyancy is ensured irrespective of the position of the floating center, due to the length of the ballonets;

The ballonets can be easily fitted on the helicopters;

The inflation can be commenced with the aircraft still flying at a moderate horizontal velocity;

The ballonets are kept in a remarkably stable position during the inflation;

Great stability of the assembly on water which results from the damping of swell oscillation;

The complete device can be easily adapted on the aircraft, so that a quick mounting may be effected when the device is required for a specific mission.

According to the present invention, the collapsible emergency buoyancy device for helicopters is characterized by the fact that it comprises two units disposed on either side of the helicopter at the rear of the cabin thereof and symmetrical relative to its longitudinal plane of symmetry, each unit comprising in turn a detachable structure secured to the helicopter framework and supporting a housing in which a ballonet adapted to be inflated with a compressed gaseous fluid is held in its uninflated folded condition with the assistance of one wall of said housing which is adapted to be released by the ballonet from the rest of the housing as the ballonet is being inflated, this ballonet having in its inflated condition the shape of a cylinder having its axis substantially parallel to the longitudinal plane of symmetry of the aircraft with two semi-spherical end tips, said structure comprising a lower cross-member having attached thereto at least one fabric panel merging tangentially in the cylindrical wall of the inflated ballonet, said fabric panel and housing forming together a stabilizing hydraulic member when the aircraft has alighted on water.

According to a specific embodiment of the invention, the ballonet is attached by means of a piece of fabric or like sheet material surrounding the aforesaid lower element of the structure, this fabric merging tangentially in the cylindrical portion of the inflated ballonet on either side thereof so as to constitute an additional stabilizing dihedral member partially filled with water when the aircraft has alighted on water.

It is advantageous to construct the upper portion of the housing and the structure elements supporting it in the form of a considerably wide bearing surface for the ballonet, thereby decreasing the contact pressure resulting from the horizontal lateral component of the ballonet lift.

In those embodiments where the ballonets are anchored by means of a fabric or like sheet element acting as a dihedral member the inner layer of this fabric is slidably mounted on the structure members surrounding the front portion of the housing, this sliding mounting being obtained preferably with the assistance of rings of which some are elongated if the aforesaid structure members are not parallel. Thus, the ballonets are safely held and stabilized in case they were inflated before the helicopter has alighted.

In order to afford a clearer understanding of the present invention and of the manner in which the same may be carried out in the practice, reference will now be made to the accompanying drawings forming part of this specification and illustrating diagrammatically by way of example a typical embodiment of the invention. In the drawings:

Figure 3 is a lateral view with parts broken away showing the structure with the ballonet in its inflated condition.

Figure 4 is a rear elevational view of the buoyancy device after its inflation.

Figure 5 is a view similar to Figure 4 but showing the device folded up, the rear lateral wall of the housing being removed to show more clearly the arrangement of the parts.

Figure 6 is a diagrammatic view showing the manner in which the inflated ballonet bears against the structure.

Figure 7 is another diagrammatic view showing the anchorage of the ballonet, and Figure 8 is a diagrammatic view showing a modified embodiment of the ballonet anchoring system.

Figure 1:
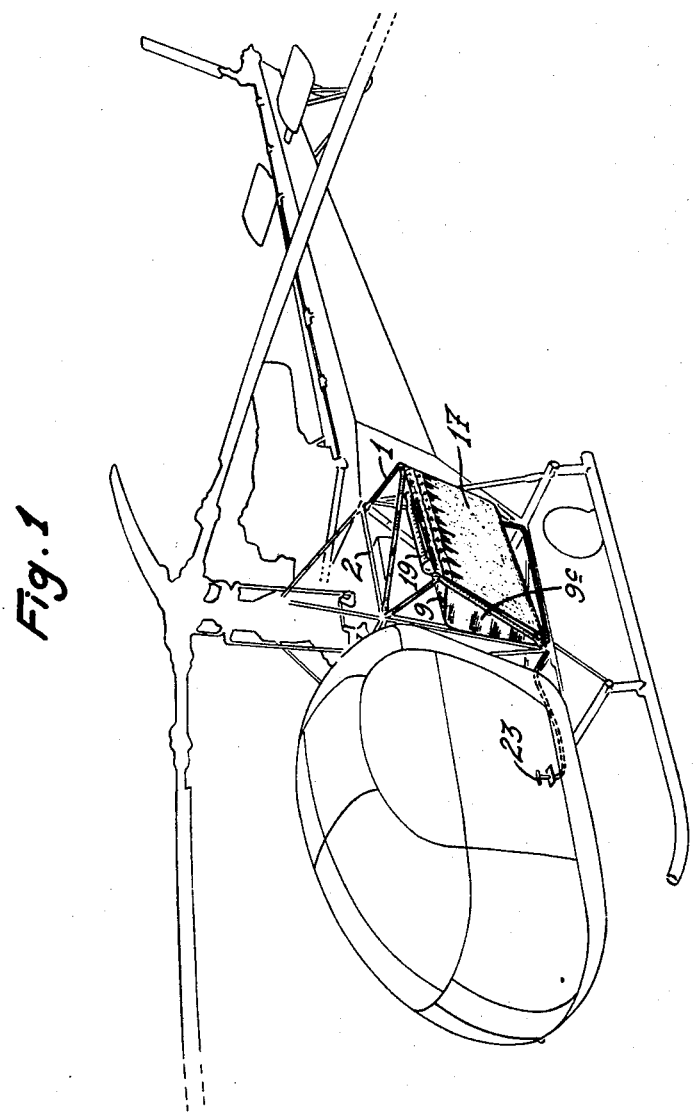
Figure 1 is a perspective view showing the arrangement of the emergency device and the structure thereof in connection with a helicopter framework.

The emergency buoyancy device according to this invention, which is intended more particularly for helicopters, comprises on either side of the helicopter cabin, as illustrated in Figure 1, a tubular frame structure 1 anchored at its assembling joints to corresponding assembling joints of truss members 2 of the helicopter framework. This frame structure 1 comprises an upper, N-shaped frame connected on the one hand to the truss members 2 and solid on the other hand with a lateral cross-member 3 (see Figure 3), the plane of this frame being slightly inclined outwards beneath the horizontal plane. The tubular cross-member 3 constitutes one side of a non cross-braced lateral frame consisting of a quadrilateral made of a pair of uprights 4, 5 diverging slightly downwards and attached, on the one hand, to the ends of the cross-member 3 and, on the other hand, to the lower element 6 of the helicopter framework. To this end, all the component elements of this device are provided with either perforated lugs or straps permitting an easy mounting by means of bolts, these fastening members being provided either on both structures or on the helicopter framework alone. This side frame is slightly inclined to the vertical and towards the helicopter framework, and is furthermore stiffened by an upper cross-member 7 and a lower cross-member 8 parallel to the cross-member 3, the common direction of these cross-members being inclined forwards and downwards relative to the longitudinal flying axis of the helicopter.

This side frame as shown in Figures 4, 6 and 7 is stiffened by a plate 9 for example of metal which is rolled and flanged on the tube 3 at its upper portion, this plate forming a bend 9d round the tube 7 to define a compartment 10 having an inclined upper wall 9e, a bottom wall 9f parallel to the lower frame element 6 of the helicopter and to the similarly inclined lower wall 9g. The lower edge of this plate is provided with a rounded portion 9h engaging and secured on the tube 8 as will be explained presently. The compartment 10 is completed above the tubes 4, 5 by transverse partitions 9b, 9c consisting of plates preferably of same material and construction as the plate 9 and connected to this plate so as to impart the necessary stiffness to the assembly.

The buoyancy ballonet 11 in the inflated condition is a cylindrical body 11a having semi-spherical end or tip portions 11b. The cylindrical portion 11a of the ballonet 11 is attached to the ends of a fabric 12 of adequate bevelled or tapered shape, the two sheets of the fabric being tangent to the ballonet and surrounding the tube 8. This surrounding portion is placed underneath the lower rib 9h of plate 9, and the members 9i, such as screws or rivets, for fastening said plate on the tube extend through this fabric 12. The inner sheet 13 of the fabric 12 is connected tangentially to the ballonet 11 to constitute a bearing surface for the inflated ballonet on that portion of the plate 9 which lies between the cross-members 3 and 7 (Fig. 6). The front portion of this sheet 13 is solid with rings 14 slidably mounted on the tube 5. The rear portion of this sheet is solid with other rings 15 sliding on the tube 4, these rings being elongated to permit the sliding movement and folding up of the sheet 13 in the vicinity of the cross-member 8 in spite of the divergence of the tubes 4 and 5.

The fixation of the fabric 12 on the tube 8 is completed by means of a strip 16 screwed or riveted thereon, this strip clamping a marginal longitudinal portion 17 of the fabric against the tube 8, this marginal portion 17 being attached on the outer upper portion of wall 9 along the tube 3, for example with the assistance of dome-fasteners, press-buttons or the like, the male elements 17a of these dome-fasteners are screwed, riveted or welded on the wall 9, whereas their female elements 17b are upset in the marginal strip 17. The plate 9 provided with the side walls 9b and 9c constitutes with the strip 17 attached to this plate an internal housing of the tubular structure 1, in which the uninflated and folded ballonet 11 is housed.

The less inclined portion of one of the housing walls 9 is provided with a rack 18 supporting inflating bottles 19 permanently connected through adequate pipelines to the ballonet. Control valves 20 are adapted to be actuated by means of flexible cables 21 movable in sheaths 22, the cable or cables being connected to a control handle 23 within easy reach of the helicopter crew and held against movement by a wire to be cut before the control handle can be actuated. The gas is led to the ballonet through a flexible tubing 24 with or without a pressure-reducing device.

Figure 2:
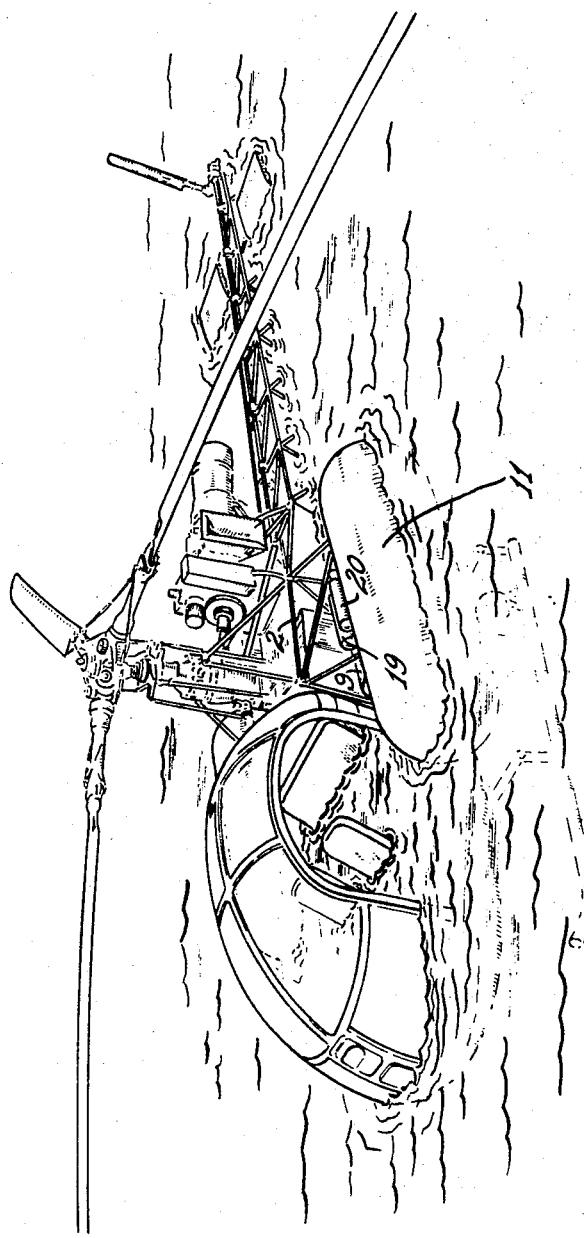
Figure 2 is another perspective view showing a helicopter having alighted accidentally on water and supported by the side ballonets of the device of this invention.

In the inoperative position, as shown in Figures 1 and 5, the front and rear portions of the ballonet 11 are folded up on the central portion thereof and the assembly comprising the ballonet and the fabric 12 is held against the partition 9 by the buttoned marginal strip 17. When the ballonet is inflated the button fastener is released and the ballonet takes the position shown in Figures 2, 3 and 4.

The safety assembly comprises two symmetric housings disposed on either side of the helicopter. The relative position of the ballonets when the helicopter is afloat, with respect to the helicopter proper, depends of course on the load distribution in the aircraft. In all cases, the ballonet is fastened along the entire length of the housing and, more particularly, due to the fastening obtained by means of the fabric 12, along the entire length of the cross-member 8 and, as a consequence of the bearing of the ballonet 11, throughout the length of the housing 9 along the tubular cross-members 3 and 7. Thus, the possibility of damaging the ballonets by the helicopter structure is avoided in the frequent cases where this structure has no fairing.

The easy mounting of the structure of the device on the helicopter framework constitutes an additional safety factor since the stresses may be applied at well-defined points in well-defined directions.

By fastening the fabric sheet 13 by means of the rings 14 and 15 on the uprights 4 and 5 it is possible to inflate the ballonet during the flight so that the helicopter may alight even if its horizontal speed is still appreciable.

To operate with the maximum safety, in the case of the helicopter illustrated the pilot must release the cabin doors before starting inflating the ballonets.

The elongated form of these ballonets and their particular mounting ensure the longitudinal stability on water, the hydraulic cushions provided inside the fold of the fabric 12 and between the sheet 13 and the housing wall 9 assist in increasing this longitudinal stability while improving the transverse stability.

It will be readily understood that many modifications may be brought to the embodiments shown and described herein, without departing from the scope of the invention as set forth in the appended claims. Thus, the ballonet 11a may be secured by means of a single external panel of the fabric 12a together with a short strip 13a also tangent to the ballonet and directly secured in the vicinity of the tubes 3a and 7a. In this case, the stabilizing hydraulic member is formed only between the housing wall 9a and the sheet 12a (Figure 8).

What I claim is:

1. In a collapsible emergency buoyancy device for helicopters, of the type comprising on either side of the helicopter and symmetrically relative to its longitudinal plane of symmetry a ballonet adapted to be inflated with a compressed gaseous fluid, folded in its uninflated condition and having in its inflated condition the shape of a cylinder having its axis substantially parallel to the longitudinal plane of symmetry of the aircraft with two semi-spherical end tips, in combination, for each ballonet, a detachable tubular structure with cross-members secured to the outside of the helicopter framework at the rear of the helicopter cabin, a housing mounted on said structure within the interval existing between said structure and the helicopter framework, provided with an outer wall releasably mounted with respect to said structure and adapted for housing the ballonet in its uninflated condition and means for holding back the ballonet in its inflated condition on one cross-member of said tubular structure, said inflated ballonet projecting laterally and forwards from said structure when being inflated after which said releasable wall detached from the rest of the housing, whereby said emergency device may be used on a land-helicopter for missions over water, wherein the tubular structure comprises an upper frame detachably secured on the helicopter framework, having an outer tubular cross-member and the plane of which is slightly inclined outwards beneath the horizontal plane, and a lateral frame having a pair of uprights diverging slightly downwards and attached at their upper ends to said outer cross-member and at their lower ends to the helicopter framework in a detachable manner, an intermediate cross-member, and a lower cross-member, these three cross-members being inclined forwards and downwards relative to the longitudinal flying axis of the helicopter.

2. A device according to claim 1, wherein the housing comprises a rigid plate secured to the outer cross-member of the upper frame, forming a bend round the intermediate cross-member of the lateral frame, then turned downwards for forming a longitudinal wall parallel to the helicopter framework and turned outwardly for forming an inclined lower wall which is secured to the lower cross-member of the lateral frame, rigid transverse partitions respectively secured to the lateral edges of said longitudinal and lower walls, a fabric marginal strip secured to said lower cross-member, and quickly-releasable fastening devices detachably securing said strip to the outer cross-member of the upper frame, the portion of said rigid plate comprised between the outer cross-member of the upper frame and the intermediate cross-member of the lateral frame acting as a bearing surface for the ballonet in inflated condition.

3. A device according to claim 1, wherein the means for holding back the ballonet in its inflated condition on one cross-member of the tubular structure comprises a fabric panel secured to the lower cross-member of the lateral frame and tangentially attached to the portion of the cylindrical surface of the inflated ballonet which is opposite to the helicopter, and a fabric strip secured between the outer cross-member of the upper frame and the intermediate cross-member of the lateral frame and tangentially attached to the cylindrical surface of the inflated ballonet opposite to the tangential attachment of said fabric panel, whereby when the helicopter alights on water after the ballonets have been inflated the panels and the inner walls of the housing form stabilizing hydraulic means.

4. A device according to claim 1, wherein the means for holding back the ballonet in its inflated condition on one cross-member of the tubular structure comprises a fabric panel passing under, and secured to, the lower cross-member of the lateral frame and forming a dihedral surface tangent to the cylindrical surface of the inflated ballonet, and means for connecting a portion of said fabric panel remote from the ballonet to the uprights of said lateral frame, whereby when the helicopter alights on water after the ballonets have been inflated the panels and the inner walls of the housing from stabilizing hydraulic means.

5. A device according to claim 4, wherein the means for connecting the fabric panel to the uprights of the lateral frame comprises rings secured on either side of said panel and slidable along the two uprights, the rings on one side of said panel being elongated to compensate the lack of parallelism between these two uprights whereby the ballonets may be correctly inflated when the helicopter is still flying notwithstanding their parts which project forwards of the structure.

References Cited in the file of this patent

UNITED STATES PATENTS

| | | |
|---|---|---|
| 1,733,973 | Monteith | Oct. 29, 1929 |
| 2,037,583 | Mapes | Apr. 14, 1936 |